United States Patent
Chen et al.

(10) Patent No.: US 10,346,375 B2
(45) Date of Patent: Jul. 9, 2019

(54) IN-DATABASE PARALLEL ANALYTICS

(75) Inventors: Qiming Chen, Cupertino, CA (US); Meichun Hsu, Los Altos Hills, CA (US); Jerry Z. Shan, Palo Alto, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 1181 days.

(21) Appl. No.: 13/457,444

(22) Filed: Apr. 26, 2012

(65) Prior Publication Data

US 2013/0290300 A1 Oct. 31, 2013

(51) Int. Cl.
*G06F 16/00* (2019.01)
*G06F 16/21* (2019.01)
*G06F 16/22* (2019.01)

(52) U.S. Cl.
CPC .......... *G06F 16/217* (2019.01); *G06F 16/221* (2019.01)

(58) Field of Classification Search
CPC .................... G06F 16/217; G06F 16/221
See application file for complete search history.

(56) References Cited

U.S. PATENT DOCUMENTS

| | | | |
|---|---|---|---|
| 5,778,354 A * | 7/1998 | Leslie ............... | G06F 17/30321 707/715 |
| 6,546,381 B1 * | 4/2003 | Subramanian .... | G06F 17/30463 |
| 2004/0133445 A1 * | 7/2004 | Rajan .................. | G06Q 10/067 717/108 |
| 2007/0027849 A1 * | 2/2007 | Meijer et al. ..................... | 707/3 |
| 2009/0234881 A1 * | 9/2009 | McCormack et al. .... | 707/103 R |
| 2011/0252002 A1 * | 10/2011 | Ben-Dyke ......... | G06F 17/30297 707/661 |
| 2011/0276789 A1 | 11/2011 | Chambers et al. | |
| 2012/0197870 A1 * | 8/2012 | Simon et al. ................. | 707/722 |

OTHER PUBLICATIONS http://www.biomedcentral.com/1471-2105/9/390; Vera, G. et al.; Sep. 22, 2008 R/Parallel—Speeding Up Bioinformatics Analysis with R.
http://dl.acm.org/citation.cfm?id=2145816.2145882&coll=DL&dl=GUIDE&CFID=94084574&CFTOKEN=15065242 , On pp. 335-336; Jiang, L. et al.; 2012; OpenMP-Style Parallelism in Data-Centered Multicore Computing with R.
http://www.mpi-inf.mpg.de/~rgemulla/publicatons/das10ricardo.pdf , On pp. 987-998; Das, S. et al.; Jun. 6-11, 2010; Ricardo; Integrating R and Hadoop.
http://dl.acm.org/citation.cfm?id=1879274.1879811&coll=DL&dl=GUIDE&CFID=94084574&CFTOKEN=15065242 , On pp. 219-234; vol. 26; Issue: 2; Thyer, M. et al.; Feb. 1, 2011; The Open Source RFortran Library for Accessing R from Fortran, with Applications in Environmental Modelling.
Emad Soroush, et al., "ArrayStore: A Storage Manager for Complex Parallel Array Processing", ACM-SIGMOD 2011, 12 pages.
Markus Schmidberger, et al, "State of the Art in Parallel Computing with R", Journal of Statistical Software, vol. 31, Issue 1, Aug. 2009, 27 pages.

(Continued)

*Primary Examiner* — Paul Kim

(57) ABSTRACT

In-database parallel analytics is disclosed. An example method includes receiving a function in a functional programming environment. The example method includes pushing operations for the function to a database layer for executing the operations. The example method also includes returning results of the operations to the functional programming environment.

17 Claims, 11 Drawing Sheets

(56) References Cited

OTHER PUBLICATIONS

Michael Stonebraker, "SciDB—A DBMS for Analytic Applications", ACM-SIGMOD 2011, 28 pages.
Teradata, "In-database analytics with TeradataR", Oct. 26, 2010, 4 pages. <http://developer.teradata.com/applications/articles/in-database-analytics-with-teradata-r>.
Yi Zhang, et al., "I/O-Efficient Statistical Computing with RIOT", ICDE 2010, 4 pages.

* cited by examiner

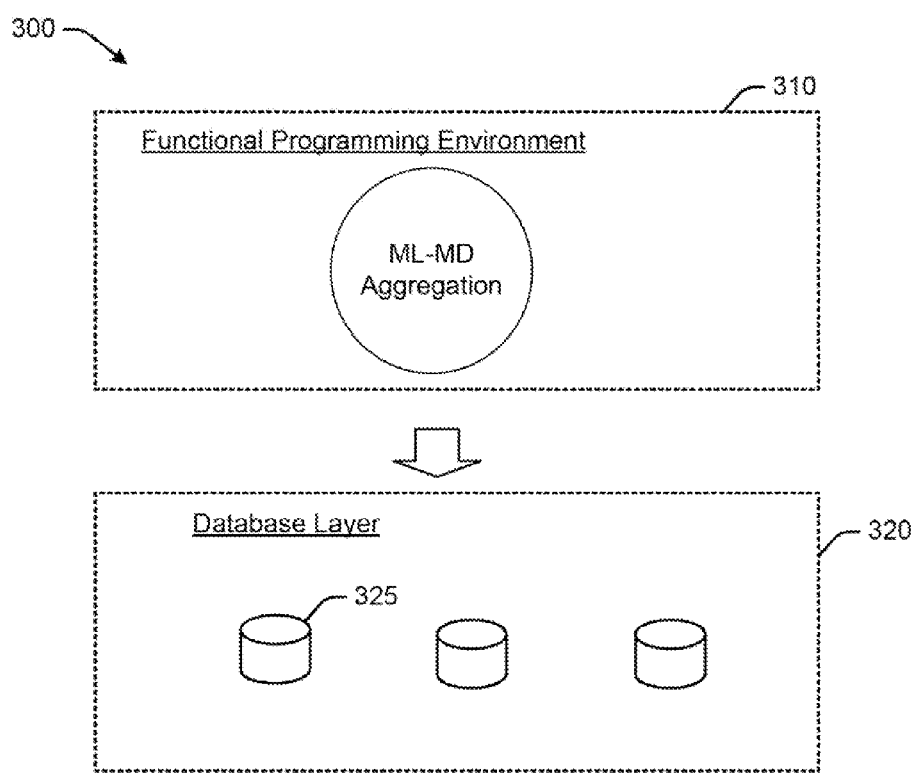

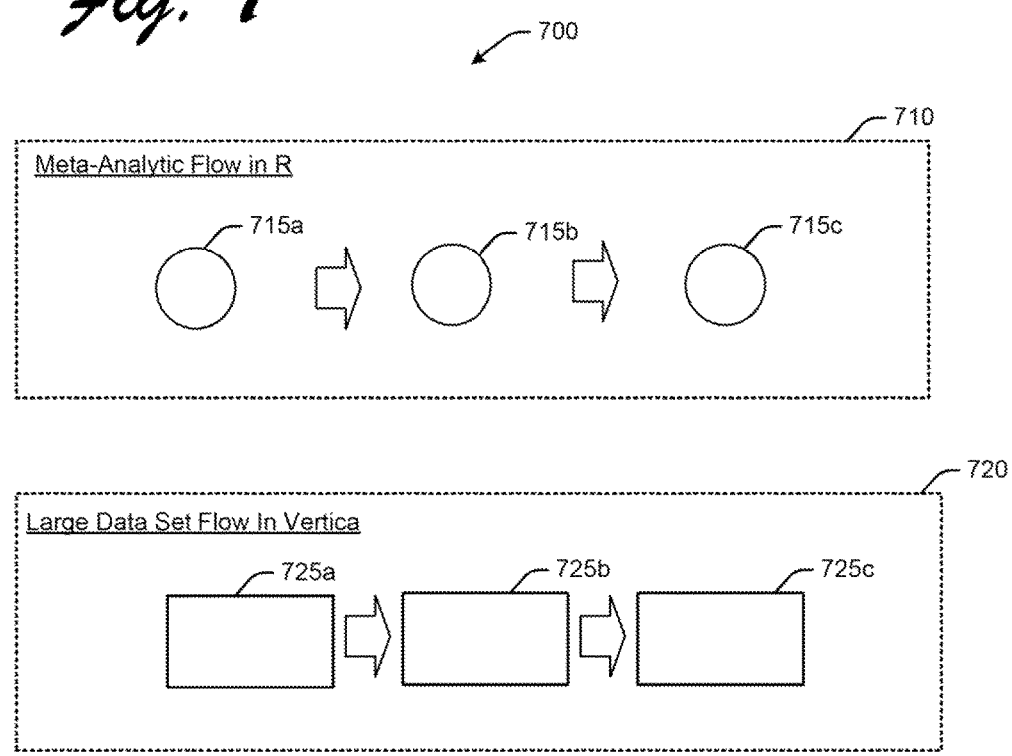

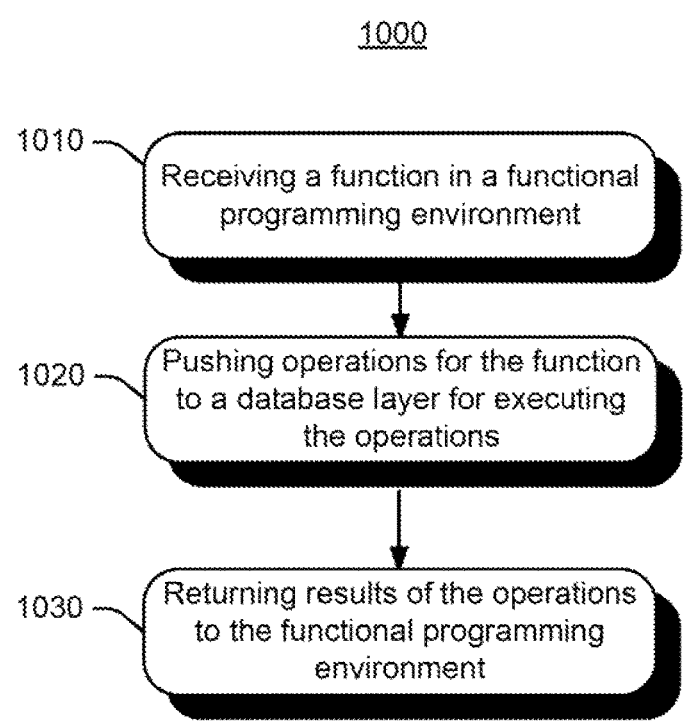

US 10,346,375 B2

IN-DATABASE PARALLEL ANALYTICS

BACKGROUND

The performance of functional programming is, in general, not comparable to system programming typically used to build database management systems (DBMS). The R programming environment is an example of a main memory-based functional programming language. Because the R programming environment is main memory based, it cannot be readily scaled for use with larger data sets. For example, using an R program to execute operations on large data sets and heavy iterations, such as OLAP operations, is often very inefficient. These issues cannot be fully solved simply by increasing processor power and number of processing cores.

By way of illustration, a high-performance, column-based parallel database engine can read data from a database 10,000 times faster than using the corresponding R program to read data into the R programming environment. But even if the R program can be split into 100 parallel threads to execute multi-level, multi-dimensional OLAP operations with sizable input data, for example, the execution time is still 100 times slower than query processing.

BRIEF DESCRIPTION OF THE DRAWINGS

FIG. 3a illustrates an example of pushing data-intensive R tasks down to parallel database for in-database data-parallel analytics.

FIG. 7 illustrates an example of R Objects and Proxies flow in the R programming layer.

FIG. 8a is a plot showing an example performance comparison of in-database and In-R aggregation on "support" data for Query a.

FIG. 10 is a flowchart illustrating example operations which may be implemented for in-database parallel analytics.

DETAILED DESCRIPTION

Figure 1:
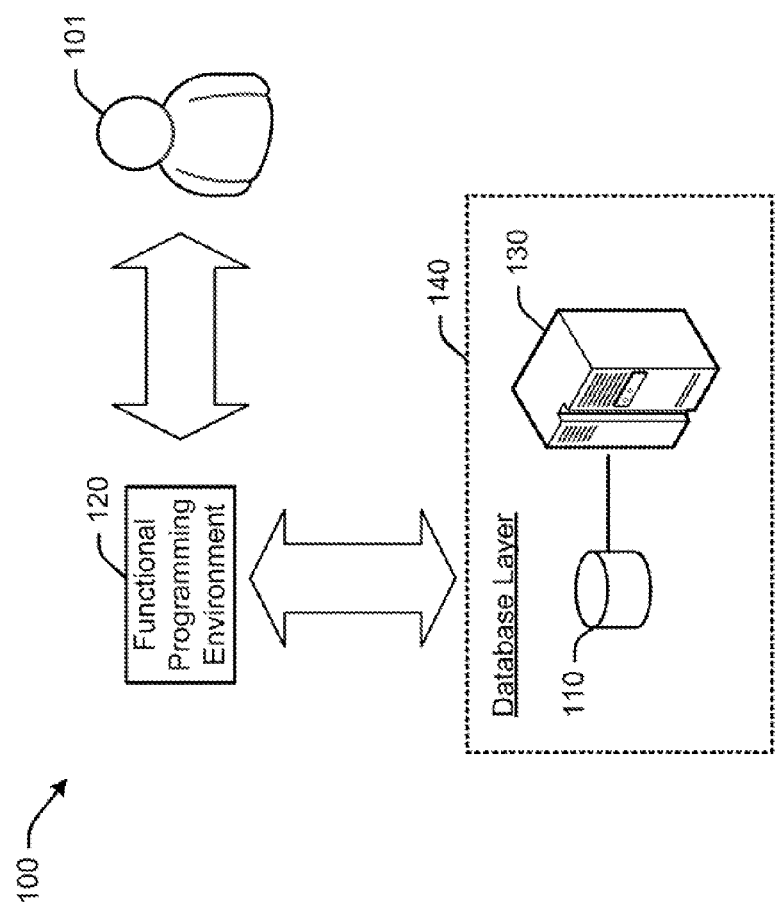
FIG. 1 is a high-level illustration of an example computer system which may implement in-database parallel analytics.

R is an open source language for statistical computing and graphics. R provides a wide variety of statistical (linear and nonlinear modeling, classical statistical tests, time-series analysis, classification, clustering) and graphical techniques, and is highly extensible. However, based on the in-memory computation, functional environment programs are difficult to scale for analytics of large data sets.

In-database parallel analytics are disclosed herein, based in an example, on the notion of a proxy object and an R-DBMS framework, an extension of the functional programming environment (e.g., the R programming environment) to the underlying parallel database system. In-database parallel analytics "pushes" data-intensive analytics "down" from the functional programming layer to the database layer. In an example, in-database analytics is integrated with a functional programming environment 120 (e.g., the R programming environment) using a framework to scale-out applications through a parallel in-database engine 130. In order to extend the functional programming environment 120 to parallel query processing, the notion of a proxy is introduced wherein the functional programming object with an instance maintained in the parallel database as partitioned data sets, and schema (header) retained in the memory-based functional programming environment. As such, a function (e.g., aggregation) is applied to a proxy and "pushed down" to the parallel database layer 140 (e.g., as SQL queries or procedures), with the query results automatically returned and converted to objects back in the functional programming language.

In addition, the top-level functional programming interface is largely retained, particularly relevant to the database layer (e.g., a parallel database layer), which separates the "virtual" flow of the big data objects at the functional programming layer, and the actual flow at the database layer.

The systems and methods support analytics (e.g., R analytics) with fast data access, reduced data transfer, minimized random access memory (RAM) requirement, and offer the benefits of the rich expressive power of a database language (e.g., the Structured Query Language (SQL)). The systems and methods may use a parallel database engine (e.g., the VERTICA® database management system by HEWLETT-PACKARD DEVELOPMENT COMPANY, L.P.), to data-parallelize the sequential building blocks of functional language programs at the database layer, instead of in the functional programming environment. Existing users can continue using the natural interface in the functional programming environment (e.g., R programming environment) that they have already become accustomed to.

Before continuing, it is noted that as used herein, the terms "includes" and "including" mean, but is not limited to, "includes" or "including" and "includes at least" or "including at least." The term "based on" means "based on" and "based at least in part on." In addition, while examples are given with respect to the R programming environment and VERTICA parallel database engine, it is noted that the systems and methods described herein may be implemented in other programming environments and database engines.

FIG. 1 is a high-level illustration of an example computer system which may implement in-database parallel analytics. The computer system 100 may include any of a wide variety of computing devices, such as, but not limited to, stand-alone computers, workstations, server computers, blade servers, and appliances (e.g., devices dedicated to providing a service). In addition, the computer system 100 may be implemented as a multi- (e.g., parallel) processing environment. Each of the computing devices may include memory, storage, and a degree of data processing capability at least sufficient to execute operations described herein.

In an example, the computer system may be implemented as a data processing service configured on a server computer and executing program code stored on computer-readable storage, and may include local and/or online services (e.g., "cloud computing"). The program code may also include interfaces to application programming interfaces (APIs) and related support infrastructure.

Before continuing, it is noted that the computing devices are not limited in function. The computing devices may also provide other services in the system 100, such as but not limited to, other transaction processing services.

The computing system may include access to at least one source 110 of data for analysis. The source may be part of the computer device, and/or the source may be physically distributed in the network and operatively associated with the computing device. Example data analysis may include data from any source (e.g., access to enterprise or government and other sources of data sets hosted on the Internet or as dynamic data endpoints for any number of client applications). The source 110 may include databases for providing information, applications for providing application data, and storage resources for providing online storage facilities, to name only a few examples. There is no limit to the type or amount of data that may be provided by the source. In addition, the content may include unprocessed or "raw" data, or the content may undergo at least some level of processing.

As mentioned above, the program code may be executed by any suitable computing device. Program code used to implement features of the system can be better understood with reference to the following illustrations and the corresponding discussion of various example functions. However, the operations described herein are not limited to any specific implementation with any particular type of program code.

In an example, in-database analytics is integrated with a functional programming environment 120 (e.g., the R programming environment) using a framework to scale-out applications through a parallel in-database engine 130. In order to extend the functional programming environment 120 to the space of parallel query processing transparently to users 101, the notion of a proxy is introduced wherein the functional programming object with an instance maintained in the parallel database as partitioned data sets, and schema (header) retained in the memory-based functional programming environment. A function (e.g., aggregation) is applied to a proxy and pushed down to the parallel database layer 140 (e.g., as SQL queries or procedures), with the query results automatically returned and converted to objects in the functional programming language.

By providing transparent mappings between several major types of functional programming objects and database tables or query results, the functional programming environment 120 and the underlying database layer 140 are seamlessly integrated. The object proxies may be created from database table schemas, in-DB operations, or the operations for persisting functional programming objects to the database. The instances of the proxies can be retrieved as objects using database queries.

Using this framework, an application in the functional programming environment 120 can be expressed as an analytics flow with the objects bearing small data sets and the proxies representing (but not bearing) large data sets. The large data sets are manipulated (or "flow") outside (or "under") the in-memory functional programming environment 120 in terms of In-DB and data-parallel operations.

Before continuing, it is noted that the components shown in FIG. 1 are provided only for purposes of illustration of an example hardware environment, and are not intended to limit implementation to any particular system.

The system 100 may execute a relational database management system (R-DBMS) 130. The VERTICA Analytic Database (also referred to herein by the trademark "VERTICA") is an example R-DBMS 130 optimized for read-intensive workloads. It provides fast ad hoc SQL query performance for supporting data warehousing and Business Intelligence (BI). In an example, the data-intensive R operations are "pushed down" to the VERTICA database layer 140. Accordingly, the parallel query engine 130 data-parallelizes the sequential building blocks of the analytics process at the database layer instead of at the R programming layer 120.

To extend R analytics to the space of parallel query processing, while keeping the natural R interface, the notion of R Proxy is introduced. According to R Proxy, the R object with instance is maintained in the parallel database (e.g., as partitioned data sets) with schema (header) retained in the memory-based R programming environment 120. A function (e.g., aggregation) applied to a proxy is pushed down to the parallel database layer (e.g., as SQL queries or procedures) to be executed efficiently by the parallel database engine 130. The query results are automatically converted to and returned as R objects.

The R programming environment 120 and the underlying database layer 140 are tightly integrated, and two-way mappings between several major types of R objects (e.g., data frames, matrix, arrays, and database tables or query results) are provided transparently. The R object proxies may be created from database table schemas, in-DB operations, or the operations for persisting R objects to the database. The instances of the R proxies can be retrieved as regular R objects using SQL queries.

In the R-VERTICA framework described herein, an R application is expressed as the analytics flow, with the R objects bearing small data, and the R proxies representing (but not bearing) large data sets. The data is manipulated to "flow underneath" the in-memory R programming environment in terms of in-database (or "In-DB") and data-parallel operations.

The R-VERTICA framework may be used to integrate multiple large-scale R applications using a multi-node VERTICA parallel database system. Executing multi-level, multi-dimensional OLAP operations with sizable input data, using VERTICA, is many orders magnitude faster than using the corresponding R program that reads and manipulates data in the R programming environment.

Figure 2:
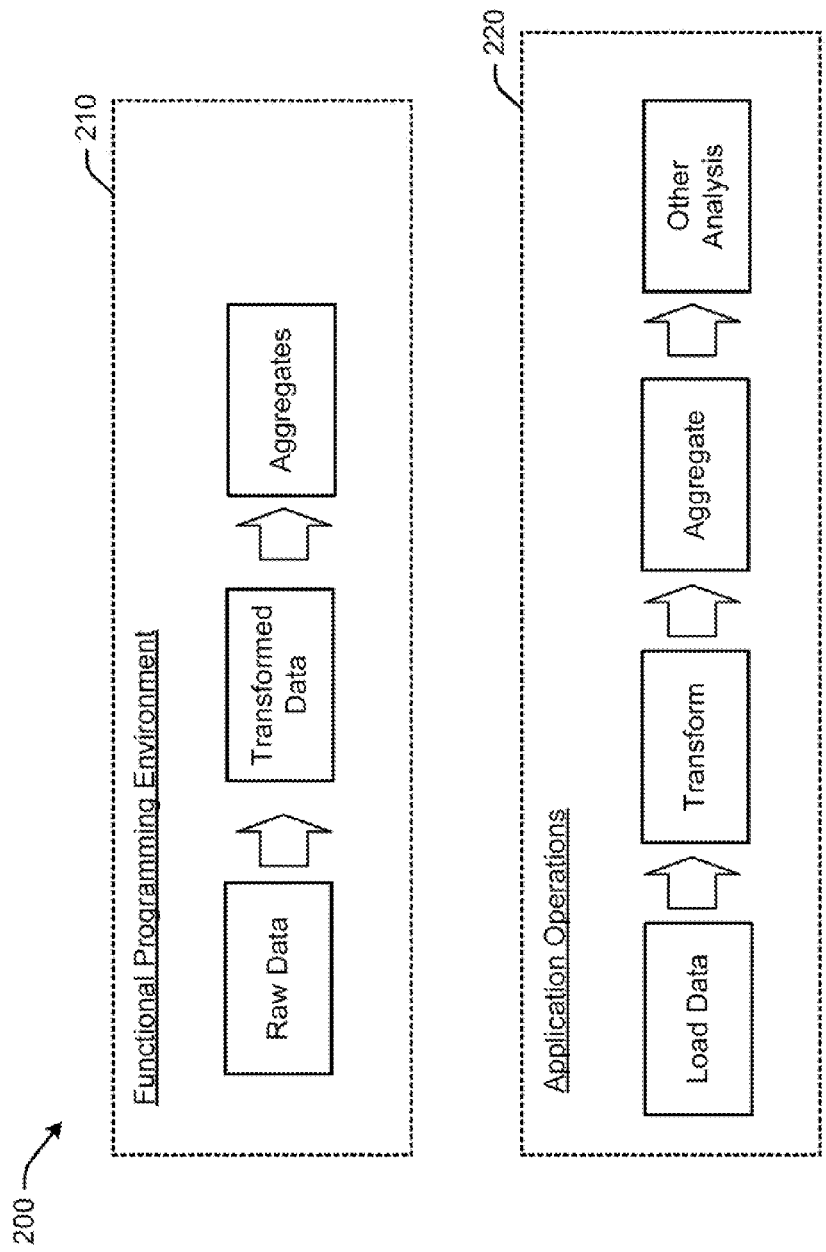
FIG. 2 illustrates an example R application with a large data set being loaded into memory, transformed and aggregated.

FIG. 2 is a high-level illustration 200 of an example R application 210 with a large data set loaded in memory, transformed and aggregated. The corresponding operations 220 include first loading the data into the R memory, transforming the data, aggregating the data and/or other analysis.

The R programming environment is an integrated suite of software facilities for data manipulation, calculation and graphical display. It provides a collection of analytics tools. New functions may be added which are implemented with SQL and actually executed by database engines. However, if the mapping between R objects and database objects is not automated, it becomes an extra burden for R programmers. If large data sets still reside in the R programming environment, and the data moving between the R and database platforms is not reduced, any performance gains are diminished.

R packages are described herein for integrating the R application with the VERTICA Analytic Database, multi-nodes, clustered parallel database management system optimized for read-intensive workloads and characterized by column storage, compression, data partition and parallel query processing. We chose VERTICA as the executor of the R operations pushed down to the data management layer, to take the above advantages.

By way of illustration, an enterprise may have revenue from selling hardware devices and providing support services for some of the delivered hardware devices. The hardware sale has characteristics, such as customer, VERTICAI domain, market segment, country, region, account class, channel, etc. The support service sale also has characteristics, such as duration, service type, category, etc. One analytics problem is to know which customer characteristics, geography, hardware characteristics and service characteristics are most influential, either positively or negatively, in the sale of support services. For this purpose, one task is to match the support with the corresponding hardware sales and to find out the total units and revenues of the supported hardware sales group by each support characteristics as well as combinations. This is a kind of multilevel, multidimensional OLAP problem.

In the example shown in FIG. 2, two large data sets are loaded from files or databases into the R program as R data-frames, with each having 1 million to 10 million records related to the enterprise's hardware sales and corresponding support. The input data is filtered, extracted, and formatted as "support" data-frames and "hardware" data-frames. The support data-frames and hardware data-frames are correlated to identify the hardware sales involved in providing the support services. The sales of hardware and resulting revenue is aggregated by group, in addition to combinations of associated support characteristics.

Using a conventional R programming environment, the large data sets reside in the memory-based R programming environment, and are operated upon by R programs. This introduces several time consuming tasks, and may include by way of example, loading data, transforming data which requires scanning the whole data set, correlating support with hardware data-frames (which may involve Cartesian-product oriented data), nested loop-based R data manipulations, and multi-level multi-dimensional aggregation of the hardware sales measures against each support characteristics. On a moderate-sized data set as illustrated by the example shown in FIG. 2, the correlation and aggregation with respect to each support characteristics can consume about 17 minutes. If 16 support characteristics are considered, it takes about 4-5 hours to complete the correlation-aggregation operations to group by each individual support characteristic, excluding any grouping by the combination of these characteristics. This computation time is too long for a near-real-time analytics service. When the larger data sets are used, the system simply fails to handle the workload.

There are at least two general performance bottlenecks in implementing the above application with a conventional R program. First, there is insufficient memory capacity for handling large data sets in the memory itself. This can cause frequent page swaps using virtual memory management. Second, manipulating large data sets (e.g., date transformation, correlation, and aggregation) is not a strength of the conventional R programming environment.

Instead, the systems and methods described herein, implement a database system to support R applications. This allows large data sets to remain in the database, thus avoiding having to load the data into the memory based R programming environment. In addition, manipulating large data sets on the database layer takes advantage of the query engine's efficient data processing capability for operations such as, but not limited to, date transformation, correlation, and aggregation. Only the results (e.g., the aggregates) are returned to the R programming environment, which also serves to greatly reduce the data transfer. Further, using a parallel database system (e.g., VERTICA), allows the In-DB analytics query to be parallelized and scaled-out over multiple computer nodes. When viewed from the R application, this means that operations are pushed down to the parallel database engine, as shown in FIG. 3a, allowing the data-parallel execution of sequential building blocks in a highly efficient and scalable way.

Figure 3B:
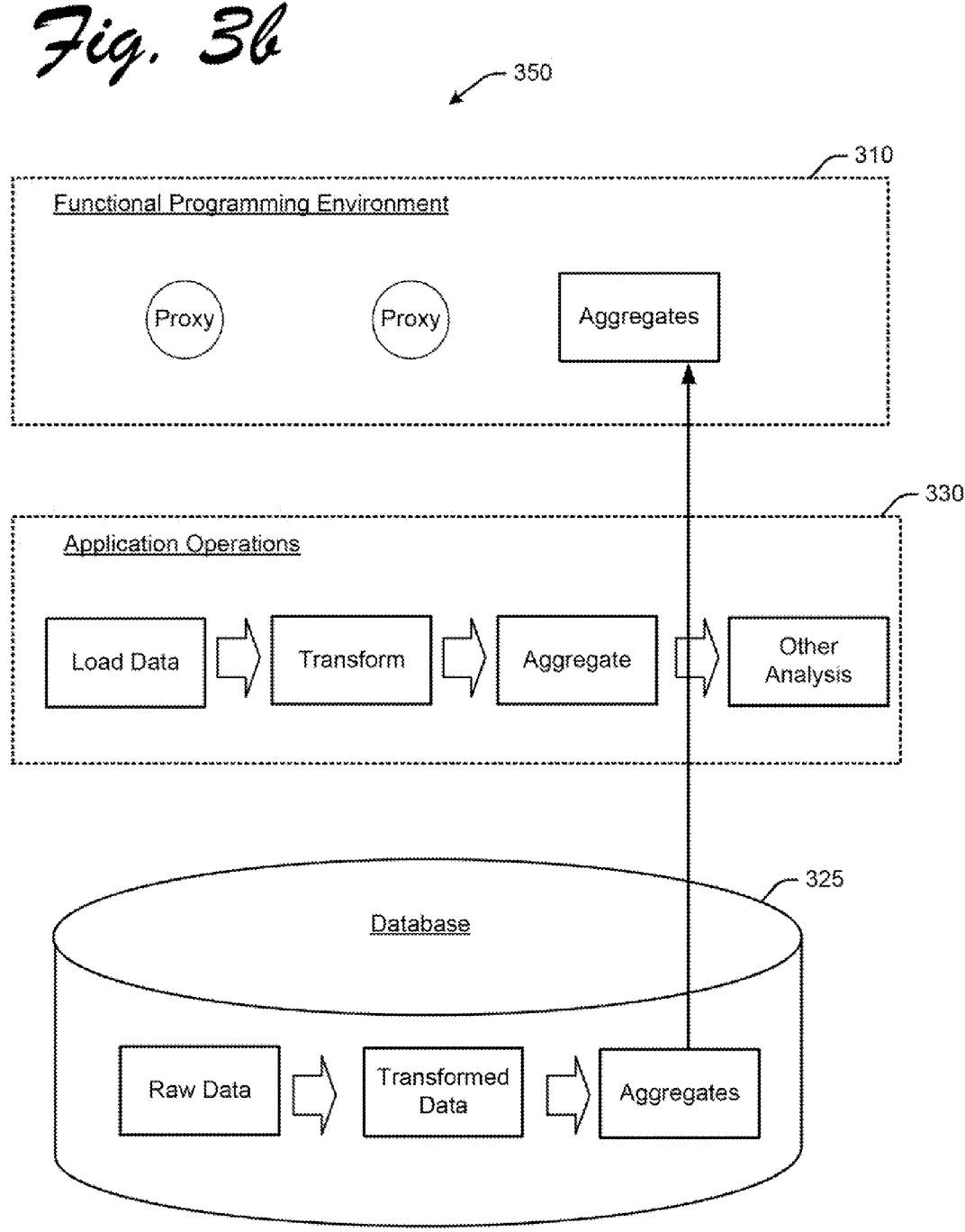
FIG. 3b illustrates an example of hardware and support tables for storing, transforming, updating, and aggregating the large data sets in a database.

FIG. 3a in an illustration 300 of an example of pushing data-intensive tasks from the functional programming environment 310 down to parallel database 320 for In-DB data-parallel analytics. The R application is implemented in the parallel database engine 320, as can be seen in the example shown in FIG. 3b. FIG. 3b is an illustration 350 of an example of hardware and support tables for the operations 330 of storing, transforming, updating, and aggregating the large data sets in a database 325.

In this example, it is no longer necessary to load instances of the two large data sets into the R programming environment 370 (e.g., into the memory). Instead, the data sets reside in the database 380 as tables (e.g., a "hardware" table and a "support" table for the above-described enterprise example). The table schemas, however, are loaded to R memory as the corresponding R data-frames, and as object proxies described in more detail below. As such, there are two headers-only (e.g., schema-only) data-frame proxies in the R programming environment 370 without corresponding large data instances.

The input data is filtered, extracted, and formatted by SQL queries. By way of example, a simple transformation can be performed by SELECT INTO or UPDATE queries. The data "flows" inside the database layer without having to be transferred to the R programming environment. Next, the support data is correlated with the hardware data (in this example) to identify the hardware sales involved in the support service, and is performed by a more complicated SQL join query. Aggregate data for the sales units and revenue of the hardware involved in the support services is grouped by each, as well as any combinations of the support characteristics, and performed by a list of AGGREGATE-GROUP BY queries.

As shown in FIG. 3b, there are no data instances of hardware and support tables loaded into the functional programming environment 310, all the way up to the aggregation step in the operations 330. Instead, these data sets are maintained in the database, and filtered, updated, transformed and aggregated in the database using SQL queries (e.g., as User Defined Functions (UDFs)). Only the aggregation results, which are much smaller than the input data, are returned to the R programming environment. It is noted, however, that the R program at the function call level remains unchanged, except for having to apply a function to the proxy results in a query execution at the database layer. In this way, the dataflow is actually represented by the flow of objects and proxies.

Using the parallel database, the "support" table is hash partitioned to multiple nodes, and the "hardware" able is replicated to those nodes. This allows the join of two tables as well as the aggregations to be carried out in parallel. In this way, the systems and methods support "parallel R" indirectly at the database layer.

Pushing the R operations down to the database layer overcomes the difficulty of using R programs to handle large data sets. The technique eliminates the need to load instances of large data sets into memory in the R programming environment. Instead, the query engine transforms, updates, and derives data efficiently inside the database environment, using a parallel query processing technique to speedup join and aggregate operations. For example, the sample data used for the above illustrations was correlated and aggregated with respect to each of the support characteristics in about 0.2 seconds (compared to 17 minutes in the conventional R programming environment). This represents a 5000 to 10,000 times performance gain (depending on the number of database nodes used), and makes the provisioning of near-real-time analytics service possible.

In order to extend R analytics to the space of parallel query processing as described above, while maintaining the natural R interface for the user, an R-VERTICA framework will now be described for seamless integration of the two systems. The systems and methods provide automatic mappings between several major types of R objects and database relations, and introduce the notion of R Proxy as an R layer representation of the data instance stored in the database. The R objects and R proxies allow an R analysis flow to be expressed in the R programming environment, but the data instance-related operations defined on R proxies are actually executed by the parallel query engine.

Figure 4:
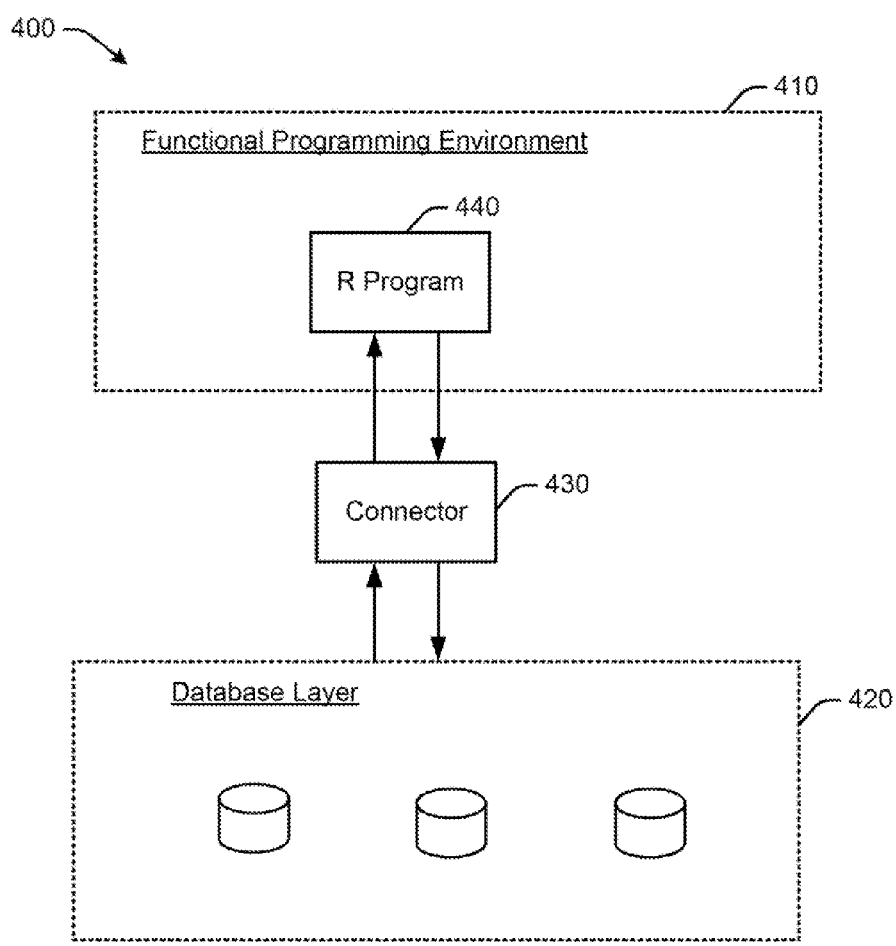
FIG. 4 illustrates an example of Connector allowing database operations to be issued from R programs and query results returned as R data-frames.

FIG. 4 is an illustration 400 of an example of an R-VERTICA Connector 430 allowing database operations to be issued from R programs 440, and query results to be returned as R data-frames. The R-VERTICA connector 430 is a package or library that provides two-way connections between the functional programming environment 410 and the VERTICA parallel database system 420. The R-VERTICA connector 430 allows an R program 440 to send queries to VERTICA 420 and receive the query results as R data-frames.

Both database Data Definition Language (DDL) and Data Manipulation Language (DML) operations are supported, such as but not limited to, create a table, truncate a table, update a table and retrieve a table. The R-VERTICA connector 430 also allows an R data-frame to be persisted in VERTICA 420 as a table. When transferring an R data frame to an automatically generated VERTICA table, the options of partitioning or replicating data over multiple nodes are supported. In addition, abstracting the object mappings make the database a virtual extension of the R programming environment 410.

Figure 5:
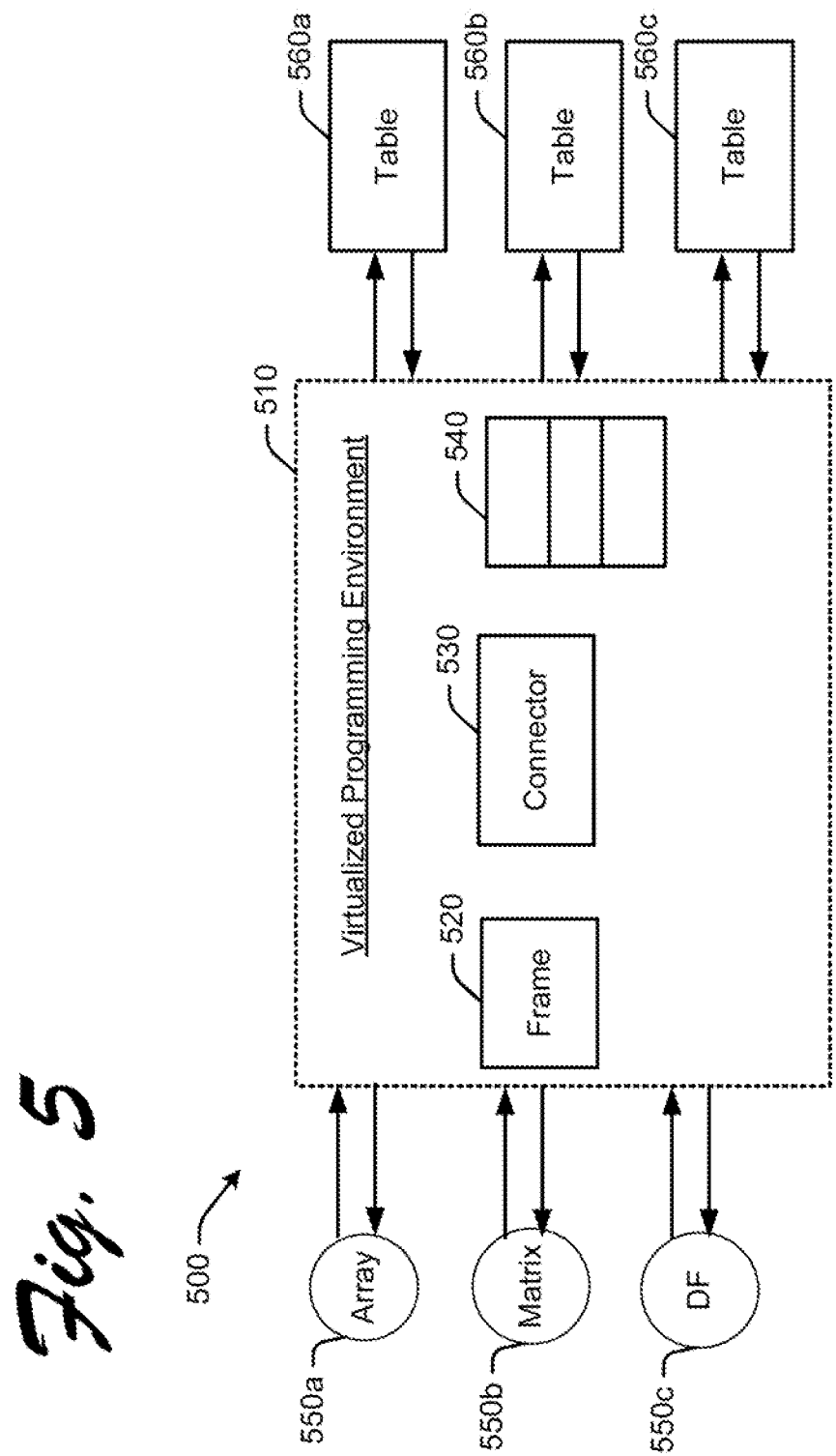
FIG. 5 illustrates an example of an Object Mapping virtualizing APIs in the R programming environment.

On top of the R-VERTICA connector 430, an abstract object mapping layer is provided to allow a compatible relation table or query result set to be converted to one of the major R objects (e.g., a matrix, an array, or a data-frame), as illustrated in FIG. 5.

FIG. 5 is an illustration 500 of an example of an R-VERTICA Object Mapping virtualizing APIs in the R programming environment. The virtualized programming environment 510 manipulates data as frames 520 via connector 530 into tables 540. With the R-VERTICA mapping, some major types of R objects 550a-c can be directly stored (e.g., using transparent data conversion) in the corresponding VERTICA tables 560a-c. For example, an array 550a in R can be persisted to the corresponding array table 560a in VERTICA.

In R, an object can have a header (schema) and a value (instance). To extend R analytics to the space of parallel query processing, while keeping the natural R interface for R users, the notion of R Proxy is introduced. That is, the R object with instance is maintained in the parallel database (e.g., as partitioned data sets), and the schema (header) is retained in the memory-based R programming environment.

Introducing the R proxy avoids having to cache and manipulate large data sets in the R programming environment, while maintaining and manipulating the data in the database itself. However, those data have to be represented and referable in R programs. To provide the reference of the corresponding database object (e.g., a table or a SQL view), a function implemented in SQL is used for launching a database operation from the R program.

The R proxy, although not bearing data instances, holds the meta-data (R object header or relation schema). Accordingly, a meta-data manipulation function, such as getNumberOfColumns(data-frame), may be used to carry out meta data manipulation. The notion of R proxy is illustrated by the example shown in FIG. 6.

Figure 6:
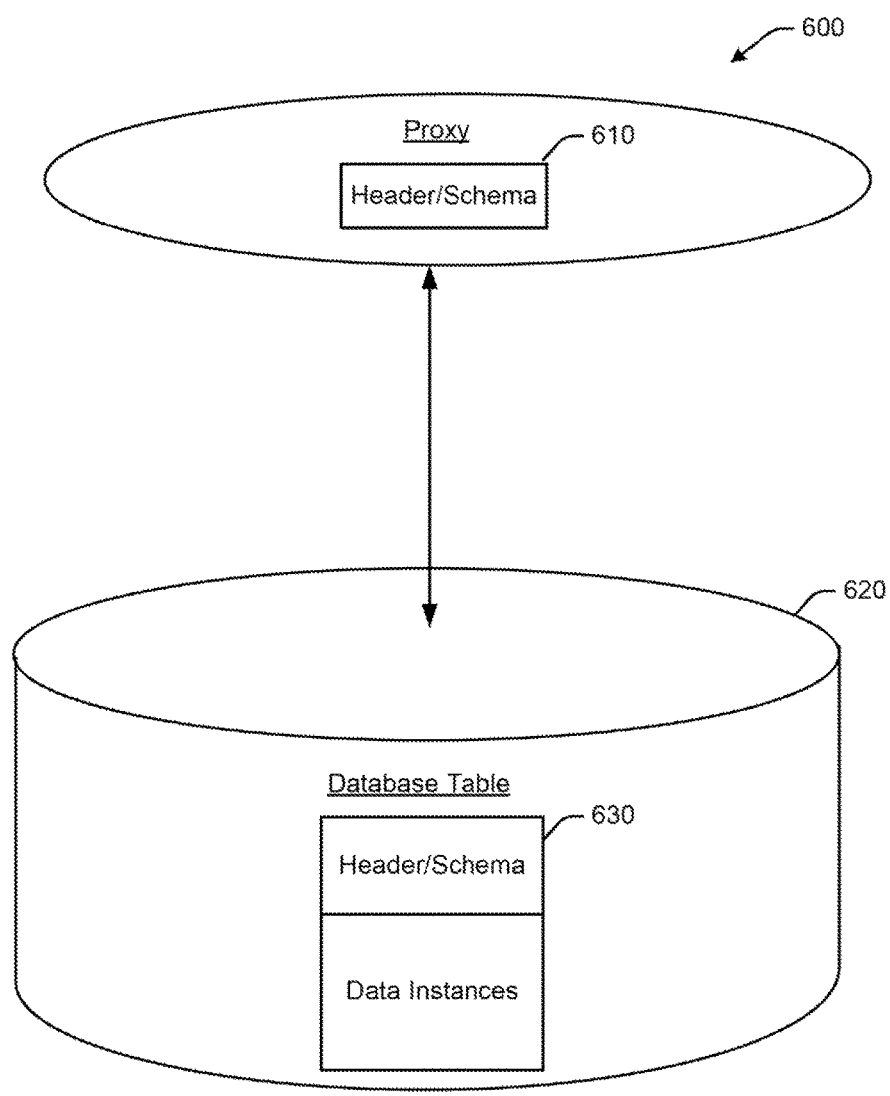
FIG. 6 illustrates an example of an R-Proxy representing the R object persisted in database and holding object header.

FIG. 6 is an illustration 600 of an example of an R-Proxy 610 representing the R object persisted in the database 620 and holding an object header or schema. The R proxy 610 represents the corresponding database object 630, such as a table or a SQL view. For example, an R data-frame proxy 610 is shown in FIG. 6 having its data stored in a table 630. The R proxy 610 also bears the meta-data (e.g., R object header or database table schema), but not necessarily the object value (e.g., data instance), unless the R proxy 610 is explicitly instantiated in the R program. For example, a data-frame proxy in R contains the header of the data-frame only. The header is consistent to the relation schema of the table 630 holding the instances of that data-frame.

There is a one-to-one mapping (illustrated by the arrow in FIG. 6) between the header of the R proxy 610 and the header or schema of the table 630. For simplicity, the same column may be used in the header of the R proxy 610 and in the corresponding schema in the table 630 to maintain the same name.

A simple version of a sync( ) operation (e.g., the change of the R object header) causes a corresponding change of the table 630 schema, but not vice versa. For example, the sync ( ) operation checks the column name consistency between an R proxy 610 header and the corresponding table 630 schema. If the name of a column is altered in the R proxy 610 header, an ALTER TABLE SQL statement is sent to the query engine to sync the table 630 schema with the proxy 610 header. A function (e.g., aggregation) to be applied to a proxy 610 is pushed down to the parallel database layer as ad-hoc SQL queries or procedures.

In the R programming environment, an object can have a header (schema) and a value (instance). Conceptually, an R proxy 610 maps to a database table 630, but retains its schema in the R programming environment. Practically, the R proxy 610 may be created from DB table 630 schema. For example, an array is stored in table matrix1 from an R proxy, also referred to as matrix1, can be created by:

matrix1←dbNewMatrixProxy( . . . ,"matrix1")

As shown above, the header of the proxy 610 is generated from the schema of the table 630. The R proxy 610 can also be derived from in-database operations. For example, new tables (not shown) and the corresponding R proxies (also not shown) may be generated, such as:

matrix2←dbMatrixTranspose( . . . ,matrix1)

matrix3←dbMatrixSub( . . . ,matrix1,dim/index parameters)

The value of an R object is stored in the database 620. When the value of an R object is persisted in the database 620, the R object degrades to a proxy with only header remaining in the R programming environment, for example as:

array1←dbCreateArrayTable( . . . ,array1)

A corresponding proxy 610 is created in R for holding a query result, for example as:

df←dbNewDfProxyByQuery( . . . ,SQL stmt)

The data instances associated with an R proxy 610 can be retrieved by instantiating (using a SELECT*query) a R-VERTICA connector or object mapping as follows:

df←dbQuery( . . . ,SQL stmt)

A subset of data is returned from the query and the result is assigned to another R object, for example as:

df←dbQuery( . . . ,SQL stmt)

The result is returned from a function that invokes a query, for example as:

arrayObject←dbGetArrayInst( . . . ,arrayProxy,dim/index . . . )

In the above example, "arrayProxy" is an R proxy and arrayObject is a standard R object.

While it can be seen that the R programming environment is extended to the database space, the integrity and natural R user interface is maintained. That is, the basic data citizens are standard R data objects, and the R proxies serve as the references of R objects that are persisted in the database. As an R object may be derived from an existing object, the R object can also be derived from the data content associated with a proxy. When a regular R data object is stored in the database, the corresponding proxy remains in the R programming environment.

A function may be defined on either a standard R data object or on an R proxy. A function (e.g., aggregation) applied to the proxy 610 is pushed down to the parallel database 620 layer as ad-hoc SQL queries or procedures to be executed at the database 620 layer, with the query results automatically converted to and returned as R objects.

The analysis of flow logic for an application can be specified in the R programming environment with functions applied to the regular and proxy R objects. Because a function applied to a proxy is actually pushed down to the database layer, the corresponding dataflow at the R layer is virtual. That is, it expresses the logic but not necessarily the instances of dataflow. The state transitions of the large data sets are actually manipulated in the database and reflect the physical dataflow corresponding to a subset of the virtual dataflow in the R programming environment.

FIG. 7 is an illustration 700 of an example showing how R Objects and Proxies flow in the R programming layer 710. The virtual dataflow at the R layer 710 involving light data volumes is shown as "airflow" 715a-c, and the dataflow at the database layer 720 involving heavy data volumes as "seaflow" 725a-c. Because the data is manipulated, or "flows" underneath the in-memory R programming environment 710 in terms of In-DB and data-parallel operations at the database layer 720, the separation of these two layers leverage the strengths of both layers for supporting enhanced scalability.

The platform described herein was tested using an example of the R programming environment based on R2.1.3. Several parallel database engines were used, having 1 node, 4 nodes and 8 nodes, respectively, built on Linux servers with gcc version 4.1.2 20080704 (Red Hat 4.1.2-50), 8G RAM, 400G disk and 8 Quad-Core AMD Opteron Processor 2354 (2200.082 MHz, 512 KB cache).

The test data was contained in two tables: (1) a "support" table, and (2) a "hardware" table. The volume of the "support" table was about 200 million records and contained 0.5 million tuples with each having 50 attributes. The volume of the "hardware" table was about 50 million records, and contained 0.25 million tuples with each having 20 attributes. By size, these data are not traditionally referred to as "large data sets," but even this size data set is too big for traditional R programs to handle with reasonable efficiency.

The R programs include two types of applications: continuous analytics and interactive query answering. In continuous analytics, the loading, transformation, join, and aggregation of big data are carried out in the database layer. The aggregated data are periodically retrieved for the R programming layer for mathematical analysis, with results either flowing in the R programming environment or being stored back to the database.

In interactive query answering, a request with parameters is input from the user GUI. The request and corresponding parameters are used to generate SQL queries, or instantiate prepared queries. The resulting query is sent to the VERTICA database through the R-VERTICA connector, with query results returned as R objects (typically data-frames).

For purposes of this test, the results are based on aggregation and OLAP operations. In the R programming environment, these operations are very inefficient. However, pushing these operations down to the database layer improved the query performance.

The R function for connecting R and parallel DB is typically coded as shown below:

```
con.VERTICA <- function(node, db)
{
    library(DBI);
    library(rJava);
    library(RJDBC);
    library(RVERTICA);
    con <- dbConnect(VERTICA( ), user = "VERTICA",
password = "", dbname = db,
        host = paste(node, ".hpl.hp.com", sep=""), port = 5433);
    con;
}
```

To connect to a database named "test," with leading node installed on machine "synapse-1," the following code may be invoked con8←con.VERTICA("synapse-1","testdb");

As an example of formulating and executing a query, the following R function was executed, wherein a user request for information is captured in the R object mList so that a SQL query is generated. The query evaluation results in the R data-frame tb as follows:

tb←hardware.mquery(con8,mList);

The above utilities underlie the R proxy manipulation. Below, the performance of running these operation in the R program is compared with pushing the corresponding query down to the database layer. The query was executed in VERTICA parallel databases with 1, 4, and 8 nodes, respectively.

The first Query "a" retrieved aggregates from the support table.

| Query a |
|---|
| SELECT s.Duration, SUM(s.support_dollars) AS total_support_dollars, SUM(s.support_units) AS total_support_units FROM support s GROUP BY s.Duration; |

Figure 8A:
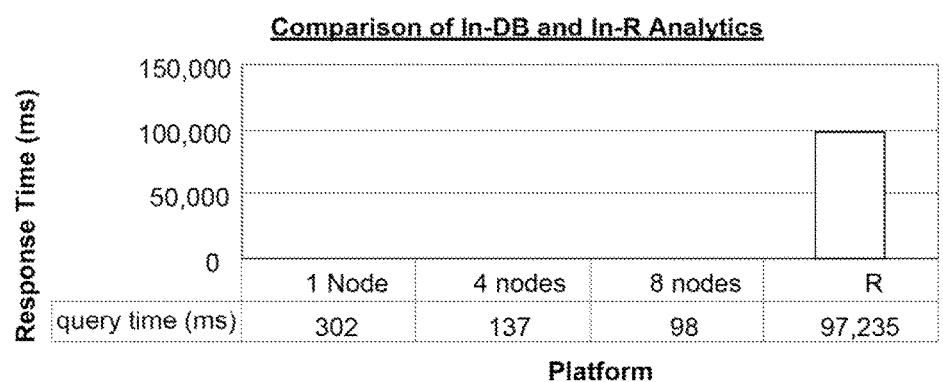

FIG. 8a is a plot 800 showing an example performance comparison of In-DB and In-R aggregation on "support" data for Query "a." The comparison shown in FIG. 8a indicates a performance gain using in-DB analytics of 3 orders of magnitudes over the In-R implementation.

The second query shown below correlates hardware information in the support table while any duplicates are removed.

---
Query b
---
SELECT Duration, SUM(hw_dollars), SUM(hw_units)
  FROM (SELECT DISTINCT Duration, s.customer_id,
s.l4_customer_id, s.VERTICAI,
    s.segment, s.region, s.country, s.f_month, s.min_channel,
s.max_channel,
      s.GBU, s.platform, hw_dollars, hw_units
        FROM support s) r
GROUP BY Duration
---

Figure 8B:
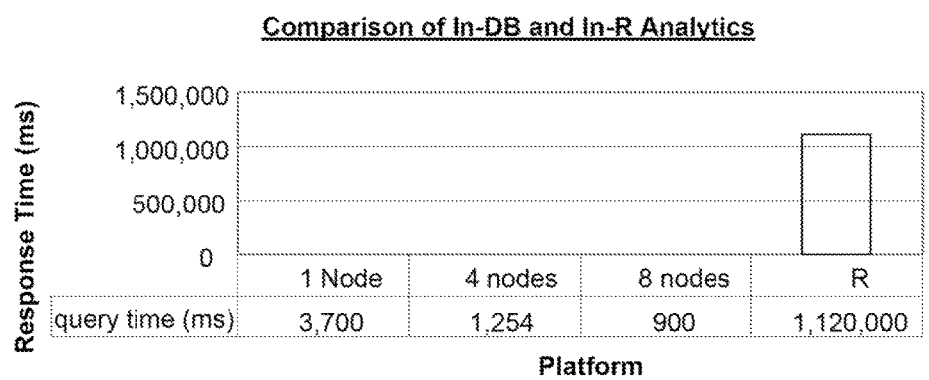
FIG. 8b is a plot showing an example performance comparison of in-database and In-R for query (b)

This is a more "expensive" query in terms of processing, than the Query a. FIG. 8b is a plot 850 showing an example performance comparison of In-DB and In-R for query "b." Here, the performance gain using In-DB analytics is almost 4 orders of magnitudes greater than In-R results.

Figure 9:
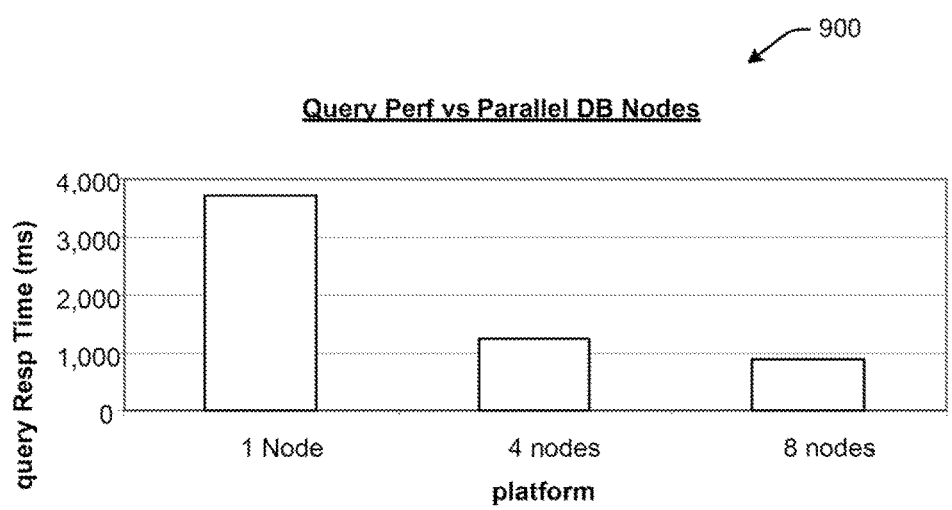
FIG. 9 is a plot showing example effects of parallelism at the database layer.

The effects of parallelism at the database layer is illustrated by FIG. 9, where the query (b) is running on 1 node, 4 nodes and 8 nodes parallel database respectively. FIG. 9 is a plot 900 showing example effects of parallelism at the database layer. The corresponding R program includes nested loops and can be inefficient. These R programs can be tedious and therefore are not shown here.

A query generated from a user request may be filtered based on factors the user is interested in analyzing. An example is provided below:

---
SELECT   coverage,   duration,   SUM(support_dollars)
AS total_support_dollars,
  SUM(support_units)  AS  total_support_units  FROM  support
WHERE coverage IN (
  'SBD', 'CTR', 'Other' ) AND duration IN ( '4y', '3y', '1y' ) GROUP
BY coverage, duration
---

Pushing a query such as this, down to the database layer offers similar performance gains as discussed above.

The R-VERTICA package described above was used to integrate large-scale R applications with a multi-node parallel database system. Testing showed that executing the typical multi-level, multi-dimensional OLAP operations with sizable input data, using a high-performance, column-based parallel database engine (e.g., VERTICA) is many orders of magnitude faster than using the corresponding R program that reads and manipulates data in the R programming environment.

Before continuing, it should be noted that the examples described above are provided for purposes of illustration, and are not intended to be limiting. Other devices and/or device configurations may be utilized to carry out the operations described herein.

FIG. 10 is a flowchart illustrating example operations 1000 which may be implemented for in-database parallel analytics. The operations may be embodied as logic instructions on one or more computer-readable medium. When executed on a processor, the logic instructions cause a general purpose computing device to be programmed as a special-purpose machine that implements the described operations. In an example, the components and connections depicted in the figures may be used.

In an example, operation 1010 includes receiving a function in a functional programming environment. The functional programming environment may be the R programming environment, although the operations are not limited to use in the R programming environment. Operation 1020 includes pushing operations for the function to a database layer for executing the operations. The database layer may be a parallel database layer, such as the VERTICA database management system described herein. However, the database layer is not limited to these examples. Operation 1030 includes returning results of the operations to the functional programming environment.

The operations shown and described herein are provided to illustrate example implementations. It is noted that the operations are not limited to the ordering shown. Still other operations may also be implemented.

Still further operations may include applying the function to a proxy (e.g., an R proxy) and pushing the proxy down to the parallel database layer as database queries and/or procedures (e.g., SQL queries and/or procedures). Operations may also include automatically returning results from the database layer to objects in the functional programming environment (e.g., R objects). Operations may also include creating object proxies from database table schemas, in-database operations, or operations for persisting objects to the database. Operations may also include retrieving proxies as objects using database queries.

Yet further operations may include expressing an application in the functional programming environment as analytics flow with objects bearing small data sets and proxies representing large data sets. Operations may also include manipulating the data in-database using data-parallel operations outside of an in-memory functional programming environment.

The operations may be implemented at least in part using an end-user interface (e.g., web-based interface). In an example, the end-user is able to interact with the system, and the operations described above are implemented on a computing device to present results to a user. Various of the operations described herein may be automated or at least partially automated.

It is noted that the examples shown and described are provided for purposes of illustration and are not intended to be limiting. Still other examples are also contemplated.

The invention claimed is:

1. A method of in-database parallel analytics, comprising:
   identifying a function applied to a proxy object in a functional programming environment executed by a hardware processor, wherein the proxy object in the functional programming environment is mapped to a corresponding database object in a database layer that is separate from the functional programming environment, wherein the proxy object in the functional programming environment includes only an object header, wherein the database object in the database layer includes a schema header and data values, and wherein the schema header of the database object in the database layer has a same name as the object header of the proxy object in the functional programming environment;
   pushing, by the processor, the function applied to the proxy object in the functional programming environment to the database layer for the database layer to execute operations of the function, including generating a database query based on the function and sending the database query to the database layer for execution;

receiving, in the functional programming environment, results of the database query executed in the database layer and assigning the results to a result object in the functional programming environment, wherein the result object is different from the proxy object;

determining, by the processor, whether the object header of the proxy object has been altered in the functional programming environment; and in response to a determination that the object header of the proxy object has been altered in the functional programming environment, updating the schema header of the corresponding database object in the database layer according to the altered object header of the proxy object.

2. The method of claim 1, wherein the proxy object does not include the data values of the database object.

3. The method of claim 1, wherein the function applied to the proxy object is an aggregation function.

4. The method of claim 1, further comprising automatically returning results from the database layer to the functional programming environment.

5. The method of claim 1, further comprising creating a plurality of proxy objects in the functional programming environment to represent a plurality of tables of the database layer.

6. The method of claim 1, wherein the functional programming environment uses a first programming language, and the database query uses a second programming language.

7. The method of claim 1, wherein generating the database query comprises using two-way mappings between the functional programming environment and the database layer.

8. The method of claim 7, wherein the two-way mappings are provided by a connector, wherein the connector translates functions of the functional programming environment to queries of the database layer, and translates results of the database layer to result objects in the functional programming environment.

9. A system for in-database parallel analytics, comprising:
at least one hardware processor;
a database layer containing a database object, wherein the database object in the database layer includes a schema header and data values; and
a functional programming environment executed by the at least one hardware processor to:
identify a function applied to a proxy object in the functional programming environment, wherein the proxy object is mapped to the database object in the database layer, wherein the proxy object in the functional programming environment includes only an object header, and wherein the object header of the proxy object in the functional programming environment has a same name as the schema header of the database object in the database layer;
push the function applied to the proxy object to the database layer for the database layer to execute operations of the function, including generating a database query based on the function and sending the database query to the database layer for execution;
receive results of the database query executed in the database layer and assign the results to a result object in the functional programming environment, wherein the result object is different from the proxy object;
determine whether the object header of the proxy object has been altered in the functional programming environment; and
in response to a determination that the object header of the proxy object has been altered in the functional programming environment, update the schema header of the database object in the database layer according to the altered object header of the proxy object.

10. The system of claim 9, wherein the proxy object does not include the data values of the database object.

11. The system of claim 9, wherein the functional programming environment uses a first programming language, and the database query uses a second programming language.

12. The system of claim 9, wherein the function applied to the proxy object is an aggregation function.

13. The system of claim 9, wherein the functional programming environment is further to create a plurality of proxy objects to represent a plurality of tables of the database layer.

14. The system of claim 13, further comprising a connector to map the plurality of proxy objects to the plurality of tables.

15. The system of claim 14, wherein the connector is further to translate functions of the functional programming environment to queries of the database layer, and translate results of the database layer to result objects of the functional programming environment.

16. An article comprising at least one non-transitory computer readable storage medium storing program code instructions that upon execution cause at least one processor to:
identify a function applied to a proxy object in a functional programming environment, wherein the proxy object in the functional programming environment is mapped to a corresponding database object in a database layer that is separate from the functional programming environment, wherein the proxy object in the functional programming environment includes only an object header, wherein the database object in the database layer includes a schema header and data values, and wherein the schema header of the database object in the database layer has a same name as the object header of the proxy object in the functional programming environment;
push the function applied to the proxy object to the database layer for the database layer to execute operations of the function, including generating a database query based on the function and sending the database query to the database layer for execution;
receive, in the functional programming environment, results of the database query executed in the database layer and assign the results to a result object in the functional programming environment, wherein the result object is different from the proxy object;
determine whether the object header of the proxy object has been altered in the functional programming environment; and
in response to a determination that the object header of the proxy object has been altered in the functional programming environment, update the schema header of the database object in the database layer according to the altered object header of the proxy object.

17. A non-transitory computer readable medium storing instructions that when executed by a processor cause the processor to:

identify a function applied to a proxy object in a functional programming environment, wherein the proxy object in the functional programming environment is mapped to a database object in a database layer, wherein the proxy object includes only a header, wherein the database object in the database layer includes a header and data values, and wherein the header of the database object in the database layer has a same name as the header of the proxy object in the functional programming environment;

push the function applied to the proxy object to the database layer for the database layer to execute operations of the function, including generating a database query based on the function and sending the database query to the database layer for execution;

determine whether the header of the proxy object has been altered in the functional programming environment;

in response to a determination that the header of the proxy object has been altered in the functional programming environment, update the header of the database object in the database layer based on the altered header of the proxy object; and receive results of the database query executed in the database layer and assign the results to a result object in the functional programming environment.

* * * * *